United States Patent
Park et al.

(10) Patent No.: US 8,811,290 B2
(45) Date of Patent: Aug. 19, 2014

(54) METHOD AND APPARATUS FOR TRANSMITTING PAGING MESSAGE IN WIRELESS COMMUNICATION SYSTEM

(71) Applicants: Gi Won Park, Anyang-si (KR); Young Soo Yuk, Anyang-si (KR)

(72) Inventors: Gi Won Park, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 13/631,018

(22) Filed: Sep. 28, 2012

(65) Prior Publication Data

US 2013/0083728 A1  Apr. 4, 2013

Related U.S. Application Data

(60) Provisional application No. 61/540,547, filed on Sep. 29, 2011.

(51) Int. Cl.
*H04W 4/00* (2009.01)
*H04W 68/00* (2009.01)

(52) U.S. Cl.
CPC .................................. *H04W 68/005* (2013.01)
USPC ........................ 370/328; 455/422.1; 455/458

(58) Field of Classification Search
CPC ....... H04W 4/06; H04W 4/005; H04W 68/00; H04W 68/005; H04W 60/00; H04W 68/02; H04W 52/0216; H04W 52/0229; H04W 76/046; H04W 52/0235
USPC .................. 370/311, 312, 328, 329; 455/434, 455/456.1, 458, 515, 422.1, 34; 709/226
See application file for complete search history.

(56) References Cited

U.S. PATENT DOCUMENTS

| 2009/0296615 | A1* | 12/2009 | Kim et al. ............... 370/311 |
| 2010/0004002 | A1* | 1/2010 | Hahn et al. ............. 455/456.1 |
| 2010/0069062 | A1* | 3/2010 | Horn et al. ............. 455/434 |
| 2011/0003603 | A1* | 1/2011 | Park et al. ............. 455/458 |
| 2011/0032860 | A1* | 2/2011 | Kojima .................. 370/312 |
| 2011/0051668 | A1* | 3/2011 | Lee et al. ............... 370/328 |
| 2011/0076987 | A1* | 3/2011 | Lee et al. ............... 455/411 |
| 2012/0157145 | A1* | 6/2012 | Lee et al. ............... 455/515 |
| 2014/0010140 | A1* | 1/2014 | Martinez Tarradell et al. .................. 370/312 |

FOREIGN PATENT DOCUMENTS

KR  WO 2010/044620  *  4/2010 ............ H04W 72/04

OTHER PUBLICATIONS

Park, Giwon, et al., Error Recovery From False Paging Indication, IEEE 802.16 Broadband Wireless Access Working Group, IEEE C802.16m-10/1461r2, Jan. 10, 2010, 4 Pages.*

IEEE P802.16p AWD: "Enhancements to Support Machine-to-Machine Applications", IEEE 802.16p-10/0018r2 IEEE, May 25, 2011, 38 Pages.*

Yi-Ting Lin et al.: "Addressing for M2M Devices and Corresponding Masking Schemes of A-A-Map IEs", IEEE C80216p IEEE, Mar. 14, 2011, 9 Pages.*

* cited by examiner

*Primary Examiner* — Edan Orgad
*Assistant Examiner* — Ivan O Latorre
(74) *Attorney, Agent, or Firm* — Lee, Hong, Degerman, Kang & Waimey (57) ABSTRACT

A method and apparatus for transmitting a paging message in a wireless communication system is provided. A base station receives a paging announcement from a paging controller. The paging announcement includes a machine-to-machine (M2M) group identity (ID) allocated by a first network entity. The base station transmits the paging message to an M2M device. The paging message includes a M2M zone ID of the first M2M zone, managed by the first network entity, allocated by the first network entity or a network entity ID of the first network entity. An M2M group ID allocated to the M2M device by a second network entity is the same as the M2M group ID included in the paging announcement.

7 Claims, 8 Drawing Sheets

METHOD AND APPARATUS FOR TRANSMITTING PAGING MESSAGE IN WIRELESS COMMUNICATION SYSTEM

CROSS-REFERENCE TO RELATED APPLICATIONS

Pursuant to 35 U.S.C. 119(e), this application claims the benefit of U.S. Provisional application No. 61/540,547 filed on Sep. 29, 2011, the content of which are incorporated by reference herein in their entirety.

FIELD OF THE INVENTION

The present invention relates to wireless communications, and more particularly, to a method and apparatus for transmitting a paging message in a wireless communication system.

RELATED ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the institute of electrical and electronics engineers (IEEE) 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

It is required to develop a method of transmitting a paging message in order to prevent a false alarm of the paging message.

SUMMARY

The present invention provides a method and apparatus for transmitting a paging message in a wireless communication system. The present invention provides a method of transmitting a paging message including an M2M zone ID or a network entity ID.

In an aspect, a method for transmitting, by a base station, a paging message in a wireless communication system is provided. The method includes receiving a paging announcement from a paging controller, the paging announcement including a machine-to-machine (M2M) group identity (ID) allocated by a first network entity, the first network entity managing a first M2M zone, transmitting the paging message to an M2M device, an M2M group ID allocated to the M2M device by a second network entity being the same as the M2M group ID included in the paging announcement, the second network entity managing a second M2M zone, the paging message including a M2M zone ID of the first M2M zone allocated by the first network entity or a network entity ID of the first network entity, and transmitting a ranging response message to the M2M device, the ranging response message including an indicator which requests to the M2M device for keeping an idle mode.

In another aspect, a base station for transmitting a paging message in a wireless communication system is provided. The base station includes a radio frequency (RF) unit for transmitting or receiving a radio signal, and a processor, operatively coupled to the RF unit, and configured for receiving a paging announcement from a paging controller, the paging announcement including a machine-to-machine (M2M) group identity (ID) allocated by a first network entity, the first network entity managing a first M2M zone, transmitting the paging message to an M2M device, an M2M group ID allocated to the M2M device by a second network entity being the same as the M2M group ID included in the paging announcement, the second network entity managing a second M2M zone, the paging message including a M2M zone ID of the first M2M zone allocated by the first network entity or a network entity ID of the first network entity, and transmitting a ranging response message to the M2M device, the ranging response message including an indicator which requests to the M2M device for keeping an idle mode.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. IEEE 802.16p is optimized for machine-to-machine (M2M) communication based on IEEE 802.16e and IEEE 802.16m. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.16p is chiefly described as an example in order to clarify the description, but the technical spirit of example embodiments of the present invention is not limited to IEEE 802.16m and IEEE 802.16p.

Figure 1:
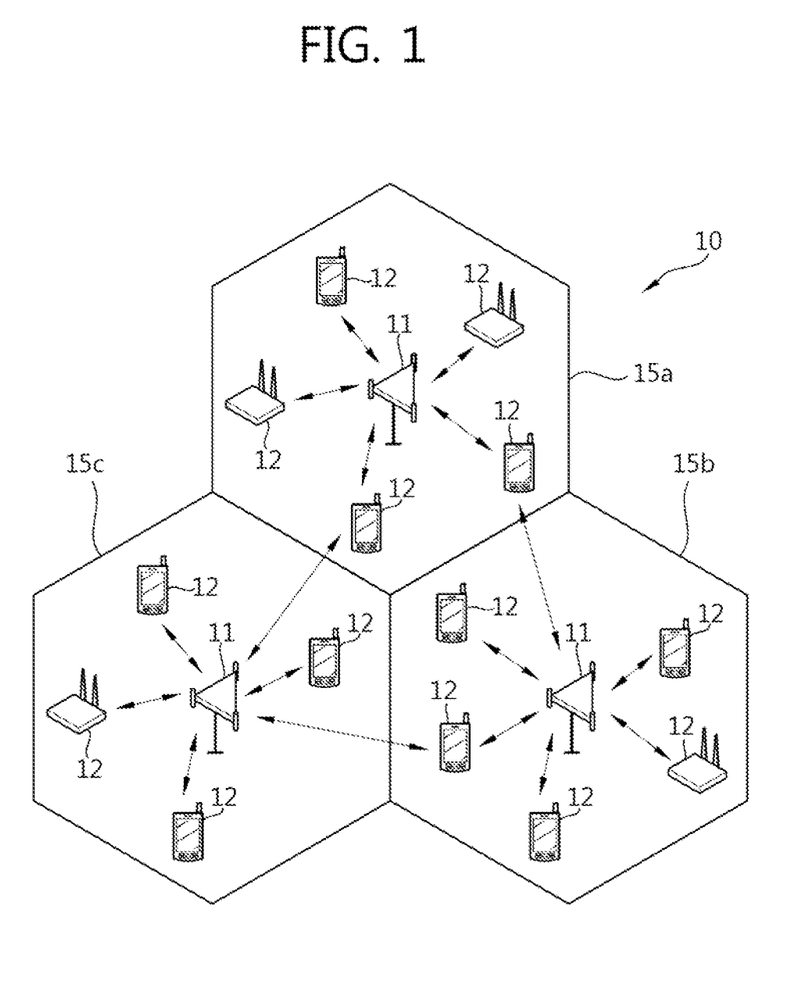
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
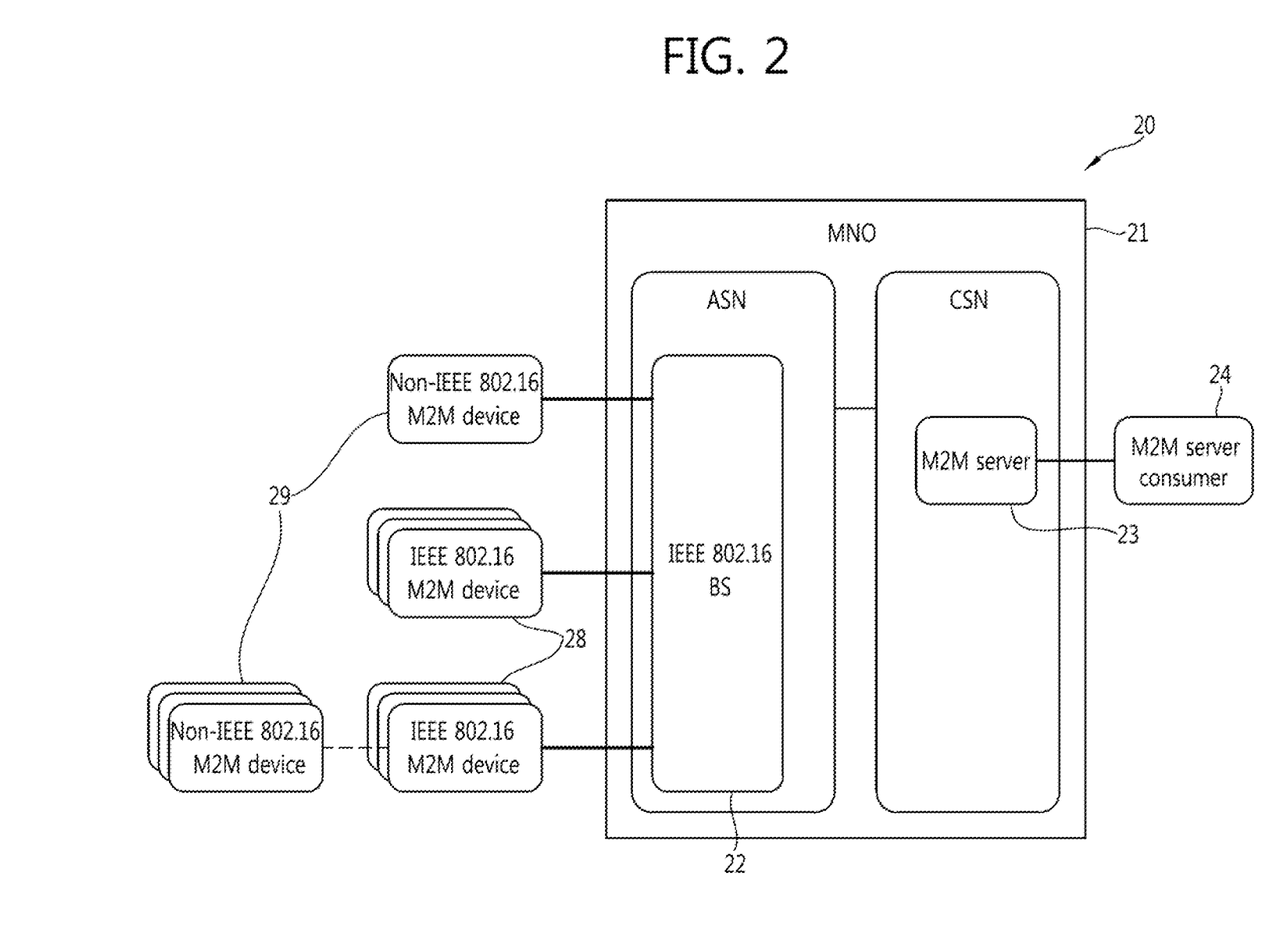
FIG. 2 shows basic machine-to-machine (M2M) service system architecture of IEEE 802.16 supporting M2M communication.

FIG. 2 shows basic machine-to-machine (M2M) service system architecture of IEEE 802.16 supporting M2M communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
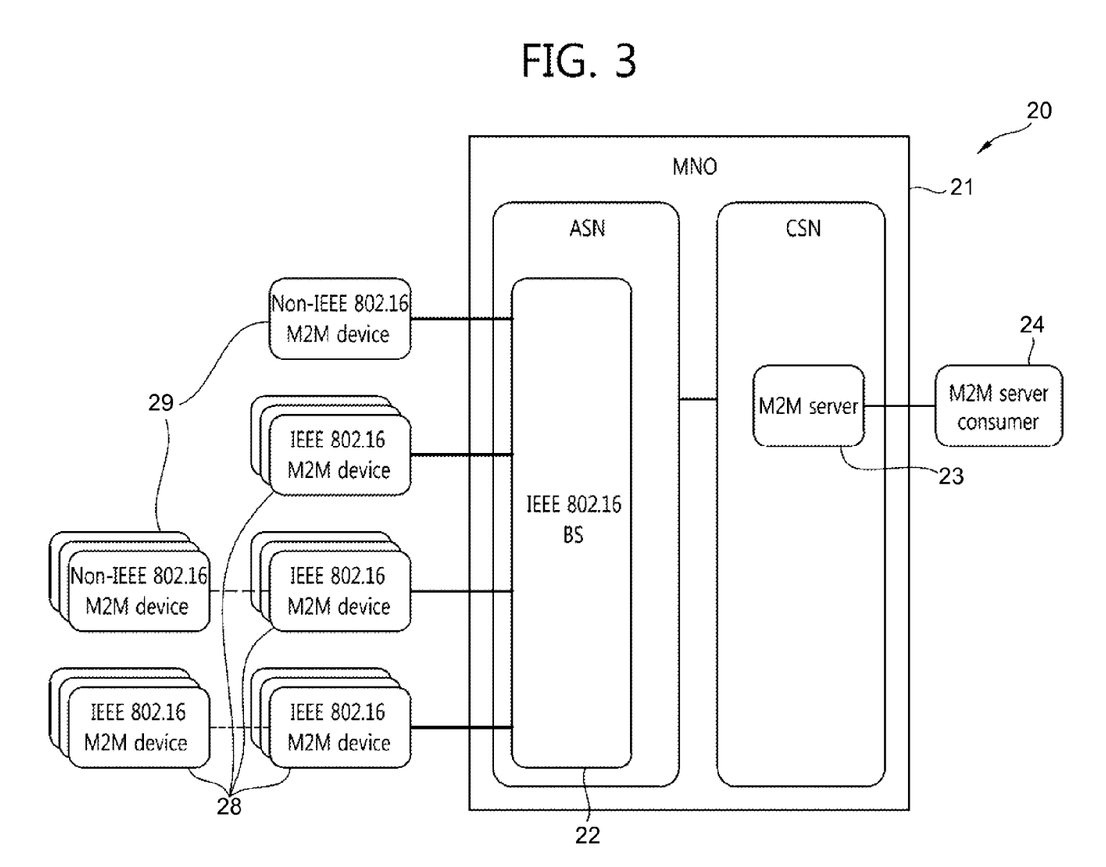
FIG. 3 shows advanced machine-to-machine (M2M) service system architecture of IEEE 802.16 supporting M2M communication.

FIG. 3 shows advanced machine-to-machine (M2M) service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Figure 4:
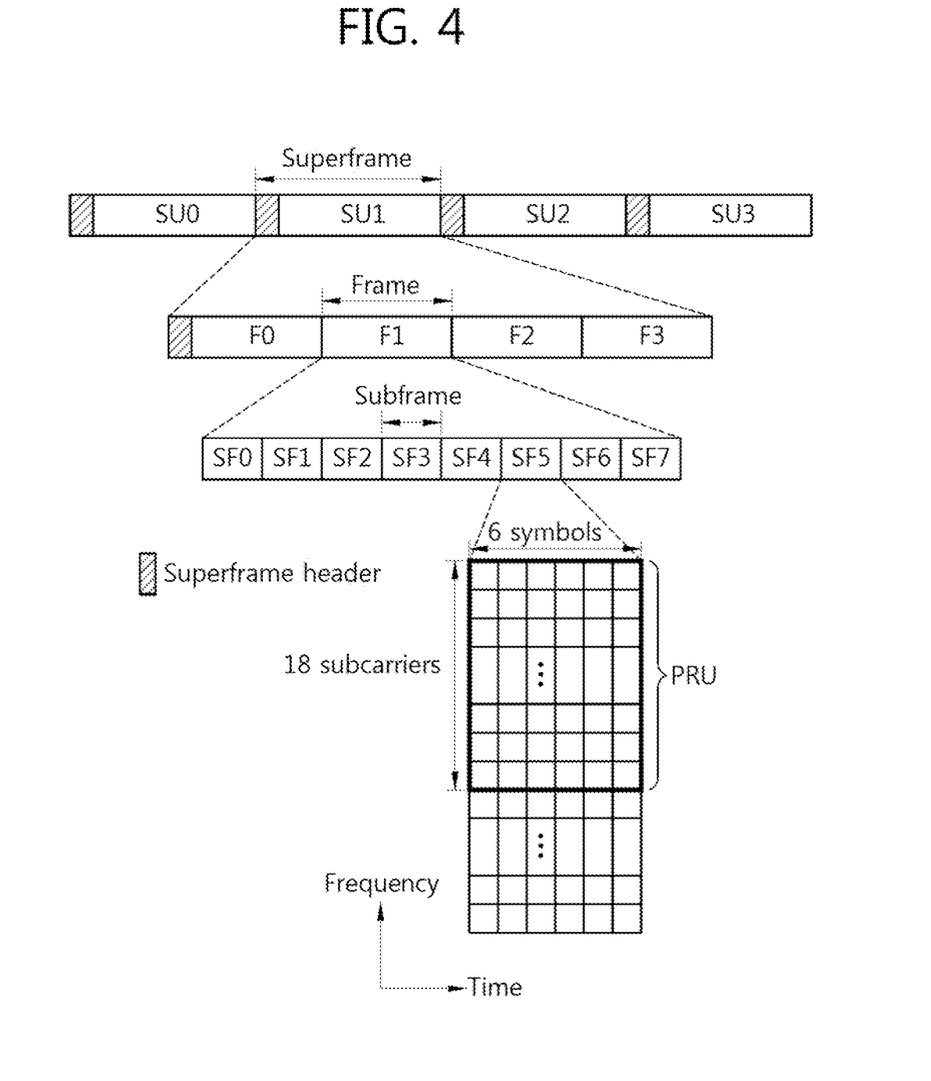
FIG. 4 shows an example of an IEEE 802.16m frame structure.

FIG. 4 shows an example of an IEEE 802.16m frame structure.

Referring to FIG. 4, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, example embodiments of the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = ⅛ | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time(μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = ¼ | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |

TABLE 1-continued

| | | | | | |
|---|---|---|---|---|---|
| Number of Guard | Left | 40 | 80 | 80 | 80 | 160 |
| subcarriers | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ is smallest power of two greater than $N_{used}$. A sampling factor $F_s$ is floor (n·BW/8000)×8000, a subcarrier spacing $\Delta f$ is $F_s/N_{FFT}$, a useful symbol time $T_b$ is $1/\Delta$, a CP time $T_g$ is $G·T_b$, an OFDMA symbol time $T_s$ is $T_b+T_g$, and a sampling time is $T_b/N_{FFT}$.

Hereinafter, a paging message will be described.

The paging message is a media access control (MAC) message received from a base station (BS) in every paging cycle by a machine-to-machine (M2M) device operating in an idle mode. The paging message can indicate the presence of downlink (DL) traffic to be transmitted to a specific mobile station (MS). Alternatively, the paging message can indicate polling of the MS and requesting of a location update without a request on a network entry. The paging message can be broadcast.

Figure 5:
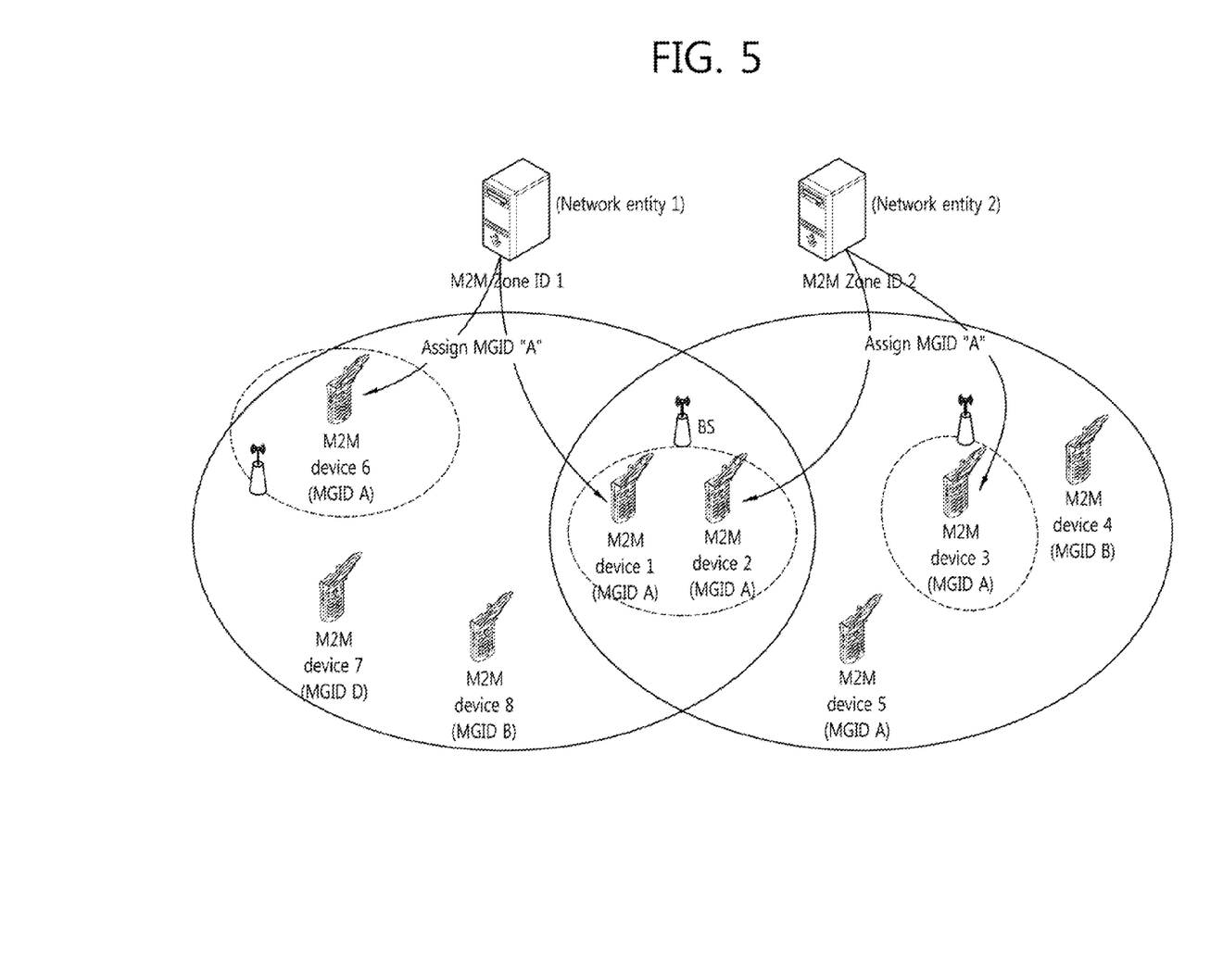
FIG. 5 shows a case where M2M zones of two network entities overlap with each other.

Table 2 shows an example of part of a paging advertisement message (i.e., AAI-PAG-ADV message) which is a paging message of IEEE 802.16p.

the M2M zone 2. The M2M zone 1 and the M2M 2 may overlap with each other. That is, the M2M devices 1 and 2 may belong to both the M2M zones 1 and 2.

The M2M group ID (MGID) assigned by a network entity in each M2M zone can be unique. The network entity 1 may assign MGID "A" in its M2M zone, and the network entity 2 may also assign the MGID "A" in its M2M zone. Accordingly, M2M devices that exist in a region in which their M2M zones overlap with each other may receive the same MGID assigned from different network entities (e.g., a network entity and an M2M sever, which assign MGIDs). That is, in FIG. 5, the M2M devices 1 and 2 may receive the same MGID "A" assigned from the respective network entities 1 and 2. In a case where the network entity 1 triggers an uplink report of the M2M device which has received the MGID "A" assigned by the network entity 1, a paging controller transmits a paging announcement to the base station that services the M2M device which has received the MGID "A" in the M2M zone 1.

TABLE 2

| Field | Size (bit) | Value/Description | Condition |
|---|---|---|---|
| ... | | | |
| For (i=0;i<Num_MGID;i++) { | | Num_MGID indicates the number of MGIDs included in this paging message [0 . . . 63] | Shall be included if the ABS sends DL multicast data for M2M after transmission of the AAI-PAG-ADV message |
| MGID | 12 | M2M Group ID | |
| M2M Group Zone Index | 2 | Zone Index corresponding to an M2M GROUP ZONE ID based on the implicit ordering of the M2M GROUP ZONE IDs in the broadcasted message. It is derived based on the implicit ordering of the M2M GROUP ZONE IDs in the AAI-SCD message transmitted by the ABS. | Present if ABS is part of more than one M2M Group Zone. |
| Action code | 2 | 0b00: Performing network reentry<br>0b01: Performing location update<br>0b10: Receiving multicast traffic without requiring network reentry<br>0b11: MGID re-assignment | |
| ... } ... | | | |

An M2M device receives an MGID assigned from a network entity during an initial network entry. The MGID is unique in M2M zones using the same M2M zone ID, and can be used for group notification (e.g., group paging, multicast service, etc.) of M2M devices. The M2M zones may overlap with one another, and the same MGID may be assigned to M2M devices belonging to different M2M zones from one another. Therefore, a false alarm of a paging message may occur.

FIG. 5 shows a case where M2M zones of two network entities overlap with each other.

Network entity 1 manages M2M zone 1 having M2M zone ID 1, and network entity 2 manages M2M zone 2 having M2M zone ID 2. M2M device 1, M2M device 2, M2M device 6, M2M device 7 and M2M device 8 may be located in the M2M zone 1. The M2M device 1, the M2M device 2, M2M device 3, M2M device 4 and M2M device 5 may be located in Since the M2M zones 1 and 2 overlap with each other, M2M devices that receive the same MGID assigned from different network entities may exist. Therefore, a false alarm of a paging message may occur.

Figure 6:
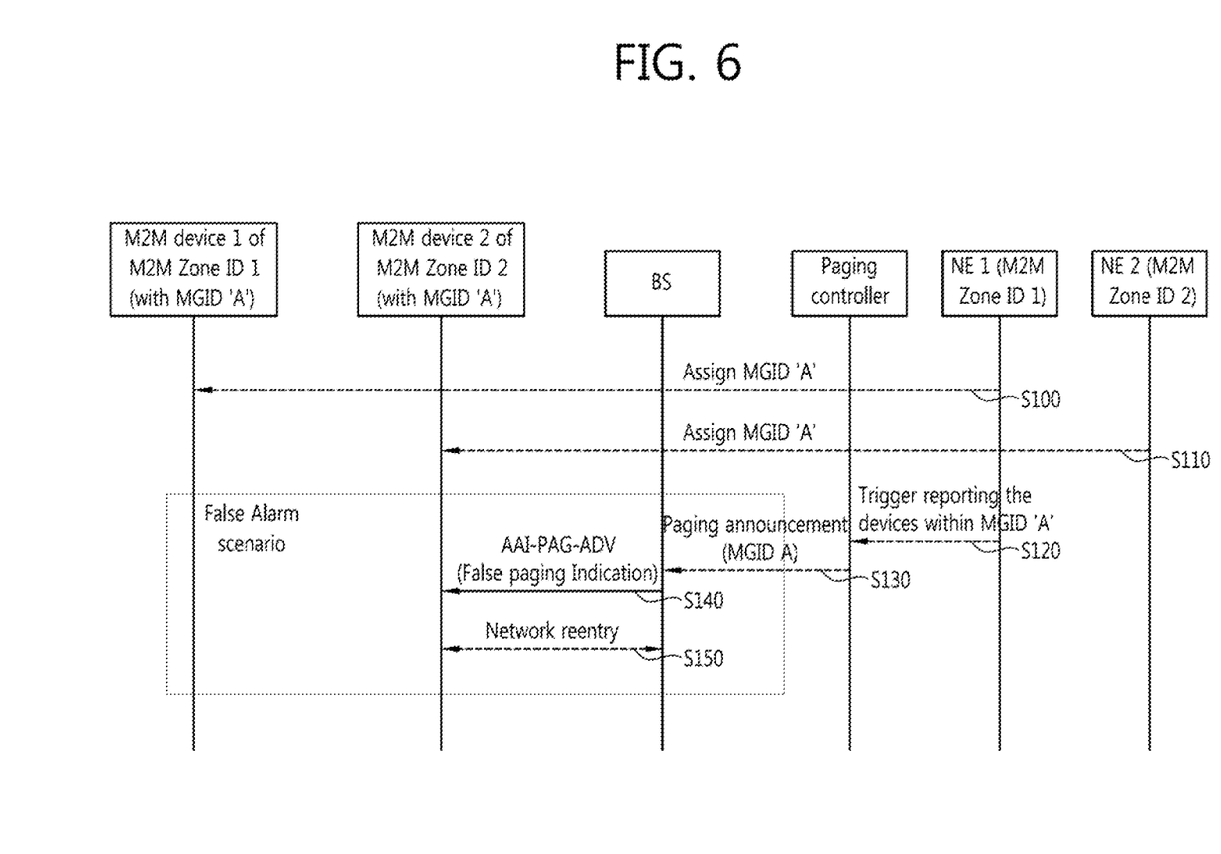
FIG. 6 shows an example of a case where a false alarm of a paging message occurs.

FIG. 6 shows an example of a case where a false alarm of a paging message occurs.

In step S100, the network entity 1 that manages the M2M zone 1 assigns MGID "A" to the M2M device 1 located in the region in which the M2M zones 1 and 2 overlap with each other. In step S110, the network entity 2 that manages the M2M zone 2 assigns the MGID "A" to the M2M device 2 located in the region in which the M2M zones 1 and 2 overlap with each other.

In step S120, the network entity 1 triggers an uplink report of the M2M device which has received the MGID "A" in the M2M zone 1. In step S130, the paging controller transmits a paging announcement to the base station that services the M2M device which has received the MGID "A."

In step S140, the base station that has received the paging announcement from the paging controller broadcasts a paging message including the MGID "A." In this case, the M2M device 2 may also receive the paging message as well as the M2M device 1. Although the network entity 1 triggers the uplink report of the M2M device 1 which has received the MGID "A" assigned by the network entity 1, it can be considered that the M2M device 2 located in the region in which the M2M zones 1 and 2 overlap with each other is also paged by receiving the paging message. That is, a false alarm of the paging message occurs.

In step 150, the M2M device 2 performs a network reentry in an idle mode network reentry in response to the paging message. That is, the M2M device 2 does not receive the paging message but must continuously maintain the idle mode. However, the M2M device 2 erroneously receives and performs the network reentry.

A method of transmitting a paging message in order to prevent a false alarm of the paging message according to example embodiments of the present invention will be described.

Figure 7:
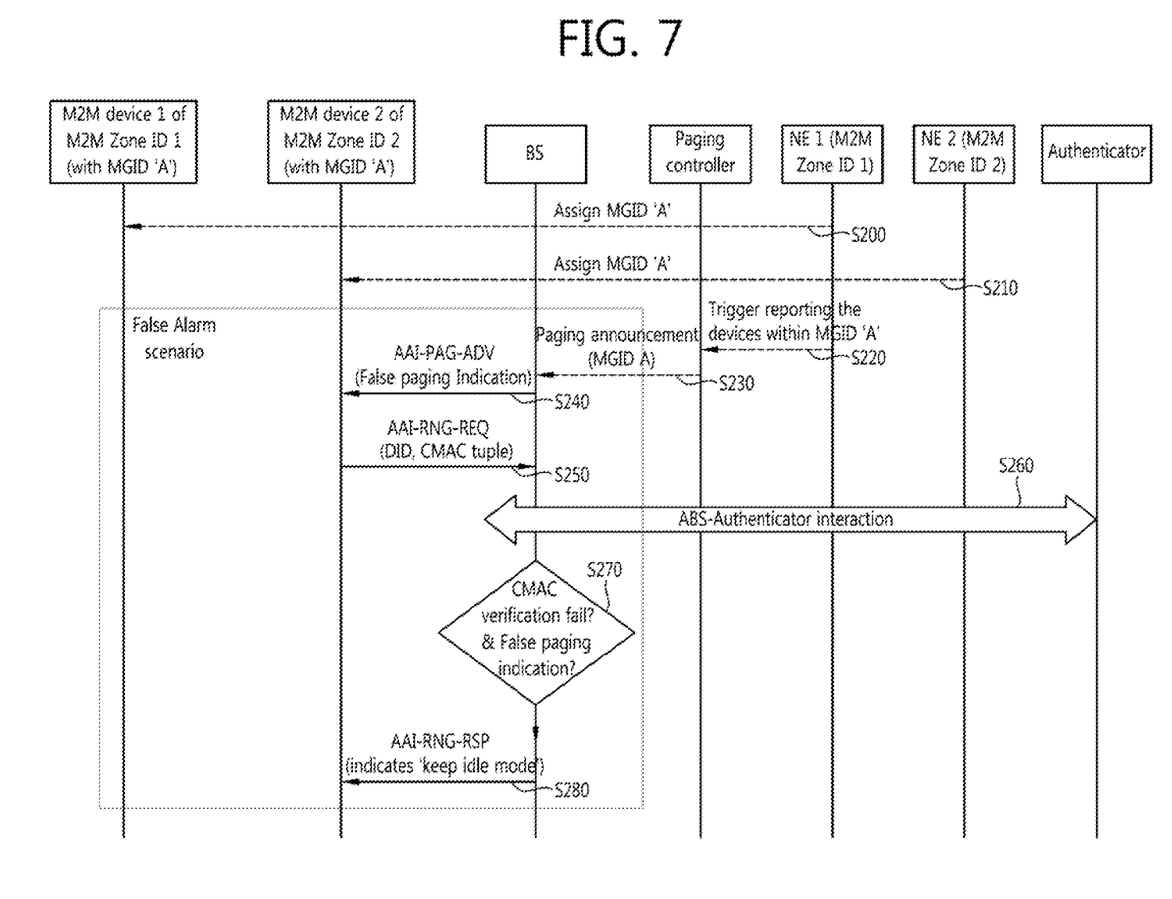
FIG. 7 shows an embodiment of the proposed method of transmitting the paging message.

There is proposed a method of transmitting a paging message including an M2M zone ID or network entity ID of the M2M zone assigned by a network entry in order to prevent a false alarm of the paging message. Table 3 shows an example of an AAI-PAG-ADV message including an M2M zone ID or network entity ID.

ing message including the MGID "A." In this case, the M2M device 2 may also receive the paging message as well as the M2M device 1. However, unlike the case of FIG. 6, the paging message includes the M2M zone ID of the M2M zone 1 or the network entity ID of the network entity 1, thus the M2M device 2 can identify that the paging message is not a paging message intended to trigger the uplink report of the M2M device 2. In step S250, the M2M device 2 transmits a ranging request message (i.e., AAI-RNG-REQ message) to the base station. The AAI-RNG-REQ message may include a device ID (DID) and a cipher-based MAC (CMAC) tuple.

In step S260, the base station receives a context through interaction between the base station and an authenticator. In step S270, the base station performs CMAC verification based on the received context. In a case where the CMAC verification fails and it is recognized that the paging message is a paging message that is falsely alarmed through the AAI-RNG-REQ message transmitted by the M2M device 2, the base station transmits a ranging response message (i.e., AAI-RNG-RSP message) to the M2M device 2 in step S280. In this case, the base station may request that the M2M device 2 continuously maintains the idle mode through the AAI-RNG-RSP message. Table 4 shows an example of the AAI-RNG-RSP message including a field for requesting that the M2M device 2 maintains the idle mode.

TABLE 3

| Field | Size (bit) | Value/Description | Condition |
|---|---|---|---|
| ... | | | |
| For (i=0;i<Num_MGID;i++) { | | Num_MGID indicates the number of MGIDs included in this paging message [0 ... 63] | Shall be included if the ABS sends DL multicast data for M2M after transmission of the AAI-PAG-ADV message |
| M2M Zone ID or network entity ID | | Indicates M2M zone ID or Indicates network entity ID | |
| MGID | 15 | M2M Group ID | |
| Action code | 2 | 0b00: Performing network reentry 0b01: Performing location update 0b10: Receiving multicast traffic 0b11: reserved | |
| ... } ... | | | |

The AAI-PAG-ADV message may include other fields which are not represented in Table 3. Referring to Table 3, the AAI-PAG-ADV message includes not only an MGID but also an M2M zone ID or network entity ID.

FIG. 7 shows an embodiment of the proposed method of transmitting the paging message.

In step S200, the network entity 1 that manages the M2M zone 1 assigns the MGID "A" to the M2M device 1 located in the region in which the M2M zones 1 and 2 overlap with each other. In step S210, the network entity 2 that manages the M2M zone 2 assigns the MGID "A" to the M2M device 2 located in the region in which the M2M zones 1 and 2 overlap with each other.

In step S220, the network entity 1 triggers an uplink report of the M2M device which has received the MGID "A" in the M2M zone 1. In step S230, the paging controller transmits a paging announcement to the base station that services the M2M device which has received the MGID "A."

In step S240, the base station that has received the paging announcement from the paging controller broadcasts a pag-

TABLE 4

| Attribute/Array of attributes | Size (bit) | Value/Description | Conditions |
|---|---|---|---|
| ... | | | |
| Keep idle mode | 1 | M2M device shall remain the idle mode | Shall be included when the CMAC verification was failed and ABS decided paged device was a false device |
| ... | | | |

The AAI-RNG-RSP message may include other fields which are not represented in Table 4. The M2M device 2 does not perform the network reentry but can continuously maintain the idle mode through the AAI-RNG-RSP message.

Figure 8:
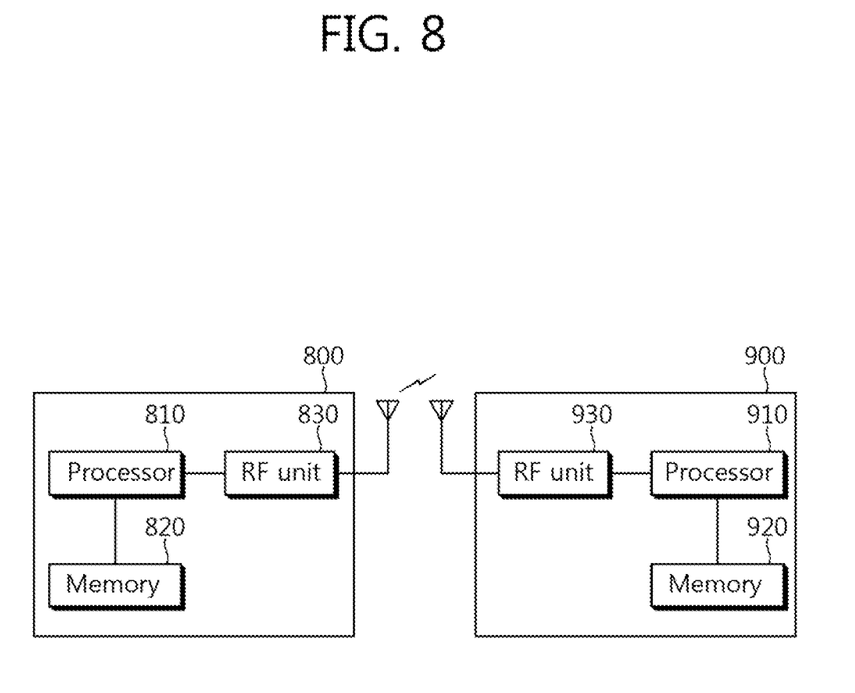
FIG. 8 shows a block diagram showing wireless communication system to implement an embodiment of the present invention.

FIG. 8 shows a block diagram showing wireless communication system to implement an embodiment of the present invention.

A BS 800 may include a processor 810, a memory 820 and a radio frequency (RF) unit 830. The processor 810 may be configured to implement proposed functions, procedures and/ or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

A false alarm of a paging message can be prevented.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a base station, a paging message in a wireless communication system, the method comprising:

receiving, by the base station, a paging announcement from a paging controller, the paging announcement including a machine-to-machine (M2M) group identity (ID) allocated by a first network entity, the first network entity managing a first M2M zone;

transmitting the paging message from the base station to an M2M device, an M2M group ID allocated to the M2M device by a second network entity being the same as the M2M group ID included in the paging announcement, the second network entity managing a second M2M zone, the paging message including a M2M zone ID of the first M2M zone allocated by the first network entity or a network entity ID of the first network entity, wherein the M2M device is located in an area where the first M2M zone and the second M2M zone overlap, and wherein the M2M device determines whether the paging message is a false paging message for the M2M device itself by using the M2M zone ID or the network entity ID included in the paging message;

if the false paging message is determined by the M2M device, receiving a ranging request message from the M2M device, the ranging request message including a device ID of the M2M device and a ciphered-based media access control (CMAC) tuple;

after receiving the ranging request, performing a CMAC verification according to a context received from an authenticator; and if the CMAC verification fails and if the paging message is determined as the false paging message, transmitting a ranging response message to the M2M device, the ranging response message including an indicator which requests to the M2M device for keeping an idle mode.

2. The method of claim 1, wherein the paging message is an AAI-PAG-ADV message.

3. The method of claim 1, wherein the ranging request message is an AAI-RNG-REQ message.

4. The method of claim 1, wherein the ranging response message is an AAI-RNG-RSP message.

5. A base station for transmitting a paging message in a wireless communication system, the base station comprising:

a radio frequency (RF) unit for transmitting or receiving a radio signal; and a processor, operatively coupled to the RF unit, and configured to:

receive a paging announcement from a paging controller, the paging announcement including a machine-to-machine (M2M) group identity (ID) allocated by a first network entity, the first network entity managing a first M2M zone;

transmit the paging message to an M2M device, an M2M group ID allocated to the M2M device by a second network entity being the same as the M2M group ID included in the paging announcement, the second network entity managing a second M2M zone, the paging message including a M2M zone ID of the first M2M zone allocated by the first network entity or a network entity ID of the first network entity, wherein the M2M device is located in an area where the first M2M zone and the second M2M zone overlap, and wherein the M2M device determines whether the paging message is a false paging message for the M2M device itself by using the M2M zone ID or the network entity ID included in the paging message;

if the false paging message is determined by the M2M device, receive a ranging request message from the M2M device, the ranging request message including a device ID of the M2M device and a ciphered-based media access control (CMAC) tuple;

after receiving the ranging request, perform a CMAC verification according to a context received from an authenticator; and if the CMAC verification fails and if the paging message is determined as the false paging message, transmit a ranging response message to the M2M device, the ranging response message including an indicator which requests to the M2M device for keeping an idle mode.

6. The base station of claim 5, wherein the paging message is an AAI-PAG-ADV message.

7. The base station of claim 5, wherein the ranging response message is an AAI-RNG-RSP message.

* * * * *